US010869165B2

(12) United States Patent
Yamada et al.

(10) Patent No.: US 10,869,165 B2
(45) Date of Patent: Dec. 15, 2020

(54) BASE STATION APPARATUS, LOCATION SERVER, AND COMMUNICATION METHOD

(71) Applicants: SHARP KABUSHIKI KAISHA, Sakai (JP); FG Innovation Company Limited, Hong Kong (CN)

(72) Inventors: Ryota Yamada, Sakai (JP); Katsuya Kato, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/322,452

(22) PCT Filed: Jul. 31, 2017

(86) PCT No.: PCT/JP2017/027641
§ 371 (c)(1),
(2) Date: Jan. 31, 2019

(87) PCT Pub. No.: WO2018/025794
PCT Pub. Date: Feb. 8, 2018

(65) Prior Publication Data
US 2020/0154239 A1 May 14, 2020

(30) Foreign Application Priority Data
Aug. 4, 2016 (JP) .................. 2016-153476

(51) Int. Cl.
H04W 4/029 (2018.01)
H04L 5/00 (2006.01)
H04W 72/04 (2009.01)

(52) U.S. Cl.
CPC .......... *H04W 4/029* (2018.02); *H04L 5/0048* (2013.01); *H04W 72/0446* (2013.01)

(58) Field of Classification Search
CPC . H04W 64/00; H04W 64/003; H04W 64/006; H04W 4/10; H04W 24/10;
(Continued)

(56) References Cited

U.S. PATENT DOCUMENTS 9,538,456 B2 * 1/2017 Yi .................. H04B 1/7143
10,512,057 B1 * 12/2019 Maheshwari ......... H04W 64/00
(Continued)

OTHER PUBLICATIONS

Ericsson, "New WI proposal on Further Enhanced MTC", RP-161321, 3GPP TSG RAN Meeting #72, Busan, Korea, Jun. 13-16, 2016.
(Continued)

*Primary Examiner* — Jean A Gelin
(74) *Attorney, Agent, or Firm* — ScienBiziP, P.C.

(57) ABSTRACT

To provide a base station apparatus, a terminal apparatus, a location server, and a communication apparatus that are capable of improving position estimation accuracy. A physical signal generating unit configured to generate first positioning reference signal and second positioning reference signal, and a transmitter configured to transmit the first positioning reference signal and the second positioning reference signal to a terminal apparatus are provided. The first positioning reference signal is mapped on one resource block and the second positioning reference signal is mapped on at least six resource blocks. The resource block is constituted of prescribed subcarriers in a frequency domain. A maximum v number of consecutive subframes on which the first positioning reference signal is transmitted is larger than a maximum number of consecutive subframes on which the second positioning reference signal is transmitted.

6 Claims, 9 Drawing Sheets

(58) Field of Classification Search
CPC ..... H04W 28/18; H04W 28/20; H04W 28/22; H04W 28/24; H04W 4/021; H04W 4/70; H04W 72/0446
See application file for complete search history.

(56) References Cited

U.S. PATENT DOCUMENTS

| | | | | |
|---|---|---|---|---|
| 2011/0176440 | A1* | 7/2011 | Frank | G01S 5/0215 370/252 |
| 2011/0268101 | A1* | 11/2011 | Wang | H04L 67/104 370/344 |
| 2013/0308567 | A1 | 11/2013 | Chen et al. | |
| 2014/0295883 | A1* | 10/2014 | Kang | H04W 64/00 455/456.1 |
| 2017/0111880 | A1* | 4/2017 | Park | H04W 4/02 |
| 2017/0238298 | A1* | 8/2017 | Wang | H04W 72/1268 455/452.1 |
| 2017/0289831 | A1* | 10/2017 | Park | G01S 5/02 |
| 2017/0339658 | A1* | 11/2017 | Wang | H04L 5/0048 |
| 2018/0014143 | A1* | 1/2018 | Rico Alvarino | H04W 72/005 |
| 2018/0020423 | A1* | 1/2018 | Wang | H04L 5/0048 |
| 2018/0097596 | A1* | 4/2018 | Palanivelu | H04W 56/001 |
| 2018/0167775 | A1* | 6/2018 | Tian | H04L 5/0048 |
| 2019/0007923 | A1* | 1/2019 | Blankenship | H04L 5/0073 |
| 2019/0200202 | A1* | 6/2019 | Ko | H04L 5/00 |
| 2019/0215121 | A1* | 7/2019 | Lin | H04L 5/0007 |

OTHER PUBLICATIONS

LG Electronics, "Positioning support for eNB-IoT", R1-166852, 3GPP TSG RAN WG1 Meeting #86, Gothenburg, Sweden, Aug. 22-26, 2016•.

ITL, "Support of OTDOA in NB-IoT", R1-167752, 3GPP TSG RAN WG1 Meeting #86, Gothenburg, Sweden Aug. 22-26, 2016.

* cited by examiner

BASE STATION APPARATUS, LOCATION SERVER, AND COMMUNICATION METHOD

TECHNICAL FIELD

The present invention relates to a base station apparatus, a location server, and a communication method.

BACKGROUND ART

In a communication system such as Long Term Evolution (LTE) or LTE-Advanced (LTE-A) standardized by the Third Generation Partnership Project (3GPP), the communication area can be widened by taking a cellular configuration in which areas covered by base station apparatuses (base stations, transmission stations, transmission points, downlink transmission devices, uplink reception devices, a group of transmit antennas, a group of transmit antenna ports, component carriers, eNodeB, and access points (APs)) or transmission stations equivalent to the base station apparatuses are arranged in the form of multiple cells (Cells) being linked together. The base station apparatuses connect to terminal apparatuses (reception points, downlink reception devices, uplink transmission devices, a group of receive antenna ports, UEs, and stations (STAs)) In such a cellular configuration, spectral efficiency can be improved by using the same frequency among neighboring cells or sectors.

Furthermore, positional information about the terminal apparatuses is used for various services, e.g. navigation and tracking. Internet Of Things (IoT) is expected to become widespread in the future, and the utilization of positional information for IoT terminals is also considered to be important for many services. This is described in NPL 1.

CITATION LIST

Non Patent Literature

NPL 1: Ericsson, "New WI proposal on Further Enhanced MTC," RP-161321, June, 2016

SUMMARY OF INVENTION

Technical Problem

However, IoT terminals mainly deal with small data and may often support only narrowbands. In general, position estimation accuracy is degraded in narrowbands. Thus, IoT terminals need accurate position estimation.

In view of these circumstances, an object of the present invention is to provide a base station apparatus, a terminal apparatus, a location server, and a communication apparatus that are capable of improving position estimation accuracy.

Solution to Problem

To address the above-mentioned drawbacks, a base station apparatus, a terminal apparatus, and a communication method according to an aspect of the present invention are configured as follows.

A base station apparatus according to an aspect of the present invention includes a transmitter configured to transmit a first positioning reference signal and a second positioning reference signal, wherein the first positioning reference signal has a narrower system bandwidth than the second positioning reference signal, and a maximum number of consecutive subframes on which the first positioning reference signal is transmitted is larger than a maximum number of consecutive subframes on which the second positioning reference signal is transmitted.

Furthermore, in the base station apparatus according to an aspect of the present invention, a minimum number of consecutive subframes on which the first positioning reference signal is transmitted is larger than a minimum number of consecutive subframes on which the second positioning reference signal is transmitted.

Furthermore, in the base station apparatus according to an aspect of the present invention, a sequence of the first positioning reference signals is initialized for each slot, and a sequence of the second positioning reference signals is initialized for each OFDM symbol.

Furthermore, in the base station apparatus according to an aspect of the present invention, a frequency density at which the first positioning reference signal is mapped is larger than a frequency density at which the second positioning reference signal is mapped.

Furthermore, in the base station apparatus according to an aspect of the present invention, the transmitter is further configured to transmit information about the first positioning reference signal and information about the second positioning reference signal to a location server.

Furthermore, a location server according to an aspect of the present invention includes a receiver configured to receive first positioning reference signal information and second positioning reference signal information from a base station apparatus and receive positional information from the terminal apparatus, and a transmitter configured to transmit the first positioning reference signal information or the second positioning reference signal information, wherein the first positioning reference signal information includes a narrowband cell ID, a system bandwidth of a first positioning reference signal, and a number of consecutive subframes for the first positioning reference signal, wherein the second positioning reference signal information includes a cell ID, a system bandwidth of a second positioning reference signal, and a number of consecutive subframes for the second positioning reference signal, the system bandwidth of the first positioning reference signal is narrower than the system bandwidth of the second positioning reference signal, and a maximum number of consecutive subframes on which the first positioning reference signal is transmitted is larger than a maximum of consecutive subframes on which the second positioning reference signal is transmitted.

A communication method according to an aspect of the present invention includes a step of transmitting a first positioning reference signal and a second positioning reference signal, wherein the first positioning reference signal has a narrower system bandwidth than the second positioning reference signal, and a maximum number of consecutive subframes in which the first positioning reference signal is transmitted is larger than a maximum number of consecutive subframes in which the second positioning reference signal is transmitted.

Advantageous Effects of Invention

According to the present invention, position estimation accuracy can be improved.

DESCRIPTION OF EMBODIMENTS

A communication system according to the present embodiment includes a base station apparatus (a transmitter, a cell, a transmission point, a group of transmit antennas, a group of transmit antenna ports, a component carrier, eNodeB, an access point), a terminal apparatus (a terminal, a mobile terminal, a reception point, a reception terminal, a receiver, a group of receive antennas, a group of receive antenna ports, UE, a narrowband terminal apparatus, a station), and a location server. The location server includes, e.g., Enhanced Serving Mobile Location Center (E-SMLC), Secure User Plane Location (SUPL), or SUPL Location Platform (SLP). The narrowband terminal is also referred to as a narrowband limited terminal, a coverage enhancement terminal, or an Internet of Things (IoT) terminal. Furthermore, the base station apparatus connected to (with an established wireless link with) the terminal apparatus is referred to as a serving cell.

The base station apparatus and the terminal apparatus according to the present embodiment can communicate in a frequency band requiring a license (licensed band) and/or a frequency band requiring no license (unlicensed band).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
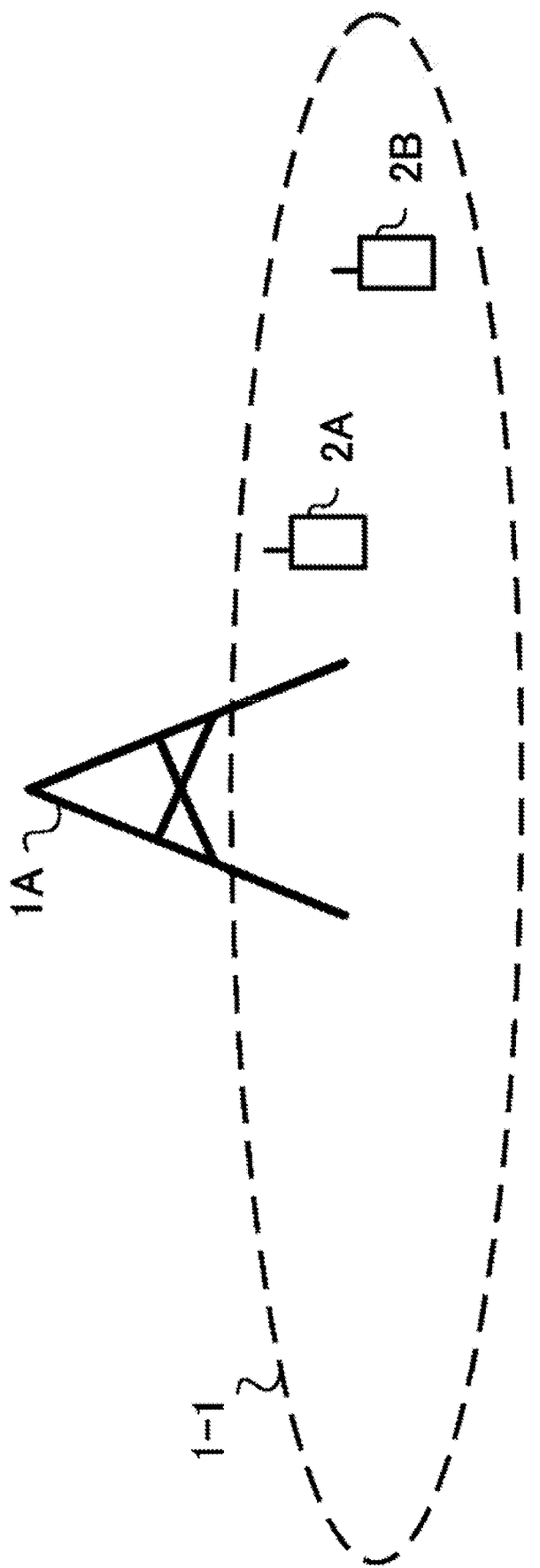
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (a communication area) in which the base station apparatus 1A can connect to the terminal apparatuses. The terminal apparatuses 2A and 2B are also collectively referred to as terminal apparatuses 2.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control CHannel (PUCCH)
Physical Uplink Shared CHannel (PUSCH)
Physical Random Access Channel (PRACH)
Narrowband Physical Uplink Shared Channel (NPUSCH)
Narrowband Physical Random Access Channel (NPRACH)

The PUCCH is used to transmit Uplink Control Information (UCI). Here, the Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared CHannel (UL-SCH) resource. The Channel State Information refers to a Rank Indicator (RI) specifying a suited spatial multiplexing number, a Precoding Matrix Indicator (PMI) specifying a suited precoder, a Channel Quality Indicator (CQI) specifying a suited transmission rate, a CSI-Reference Signal (CSI-RS) Resource Indication (CRI) indicating a suited CSI-RS source, and the like.

The Channel Quality Indicator (hereinafter, referred to as a CQI value) can be a suited modulation scheme (e.g., QPSK, 16QAM, 64QAM, 256QAM, or the like) and a suited coding rate in a prescribed band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator are collectively referred to as CSI values.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the Uplink Control Information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH and the NPRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a DeModulation Reference Signal (DMRS) and a Sounding Reference Signal (SRS).

DMRS is associated with transmission of PUCCH or NPUSCH. For example, the base station apparatus 1A uses DMRS in order to perform channel compensation of PUSCH or PUCCH or NPUSCH. SRS is not associated with the transmission of the PUSCH or the PUCCH. For example, the base station apparatus 1A uses SRS to measure an uplink channel state.

In FIG. 1, the following downlink physical channels are used for the downlink radio communication from the base station apparatus 1A to the terminal apparatus 2A. The downlink physical channels are used for transmitting information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Narrowband Physical Downlink Shared Channel (NPDSCH)
Narrowband Physical Broadcast Channel (NPBCH)
Narrowband Physical Downlink Control Channel (NPDCCH)

PBCH is used for broadcasting a Master Information Block (MIB, a Broadcast CHannel (BCH)) that is shared by the terminal apparatuses. PCFICH is used for transmission of information indicating a region (e.g., the number of Orthogonal Frequency Division Multiplexing (OFDM) symbols) to be used for transmission of PDCCH. NPBCH is used for transmission of broadcast information.

PHICH is used for transmission of ACK/NACK with respect to uplink data (a transport block, a codeword) received by the base station apparatus 1A. In other words, PHICH is used for transmission of a HARQ indicator (HARQ feedback) indicating ACK/NACK with respect to the uplink data. Note that ACK/NACK is also called HARQ-ACK. The terminal apparatus 2A reports ACK/NACK having been received to a higher layer. ACK/NACK refers to ACK indicating a successful reception, NACK indicating an unsuccessful reception, and DTX indicating that no corresponding data is present. In a case that PHICH for uplink data is not present, the terminal apparatus 2A reports ACK to a higher layer.

PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, a TPC command for PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, a TPC command for PUSCH, and the like. Here, the DCI format for the uplink is also referred to as uplink grant (or uplink assignment).

Here, the DCI format for the uplink can also be used to request Channel State Information (CSI, also referred to as reception quality information) for the downlink.

The DCI format for the uplink can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (aperiodic CSI). The CSI feedback report can be used for a mode configuration (CSI report mode) to a periodically report the Channel State Information. The base station apparatus can configure any one of the periodic CSI feedback report and the aperiodic CSI feedback report. In addition, the base station apparatus can configure both the periodic CSI feedback report and the aperiodic CSI feedback report.

The DCI format for the uplink can be used for a configuration indicating a type of the CSI feedback report that is fed back to the base station apparatus by the terminal apparatus. Types of the CSI feedback report include wideband CSI (e.g., Wideband CQI) and narrowband CSI (e.g., Subband CQI).

NPDCCH is used for transmission of control information.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information of the scheduled PUSCH.

PDSCH is used for transmission of downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific information (unique to user equipment) is transmitted using a message dedicated to the given terminal apparatus. PDSCH is used for transmission of MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

NPDSCH is used for transmission of system information. NPDSCH is also used for transmission of downlink data.

In the downlink radio communication, a Synchronization signal (SS) and a DownLink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used for the terminal apparatus to calculate the downlink Channel State Information.

Furthermore, a narrowband synchronization signal is used as a downlink physical signal for narrowband downlink radio communication. The narrowband synchronization signal includes a Narrowband Primary Synchronization Signal (NPSS) and a Narrowband Secondary Synchronization Signal (NSSS). The NSSS indicates 504 narrowband physical cell IDs.

Here, the Downlink Reference Signal includes a Cell-specific Reference Signal (CRS), a UE-specific Reference Signal (URS) or a terminal apparatus-specific reference signal associated with PDSCH, a DeModulation Reference Signal (DMRS) associated with EPDCCH, a Non-Zero Power Channel State Information-Reference Signal (NZP CSI-RS), a Zero Power Channel State Information-Reference Signal (ZP CSI-RS), a Positioning Reference Signal (PRS), and a Narrowband Reference Signal (NRS).

CRS is transmitted in all bands of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. The terminal apparatus 2A performs signal measurement (channel measurement), using NZP CSI-RS. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

PRS is transmitted in a subframe configured for transmission of PRS. PRS is used for measurement of a position of the terminal apparatus. A resource on which PRS is to be mapped is determined based on the cell ID. A PRS sequence refers to a pseudo-random sequence. An initial value for a pseudo-random sequence for generation of a PRS sequence is calculated based on some or all of a slot number, OFDM symbol numbers in a slot, the cell ID, an ID of PRS, and a CP length. The CP length is information indicating whether the CP is a normal cyclic prefix or an extended cyclic prefix longer than the normal cyclic prefix. Note that the subframe is constituted of two slots. For example, the slot is constituted of seven OFDM symbols.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing is performed for each codeword.

Furthermore, for communication with terminal apparatuses supporting Carrier Aggregation (CA), the base station apparatus can integrate multiple Component Carriers (CC) together for broader band transmission. The carrier aggregation involves configuring one Primary Cell (PCell) and one or more Secondary Cells (SCells) as a set of serving cells.

Furthermore, for Dual Connectivity (DC), a Master Cell Group (MCG) and a Secondary Cell Group (SCG) are configured as a group of serving cells. MCG is constituted of PCell and optionally one or more SCells. In addition, SCG is constituted of primary SCell (PSCell) and optionally one or more SCells.

Figure 2:
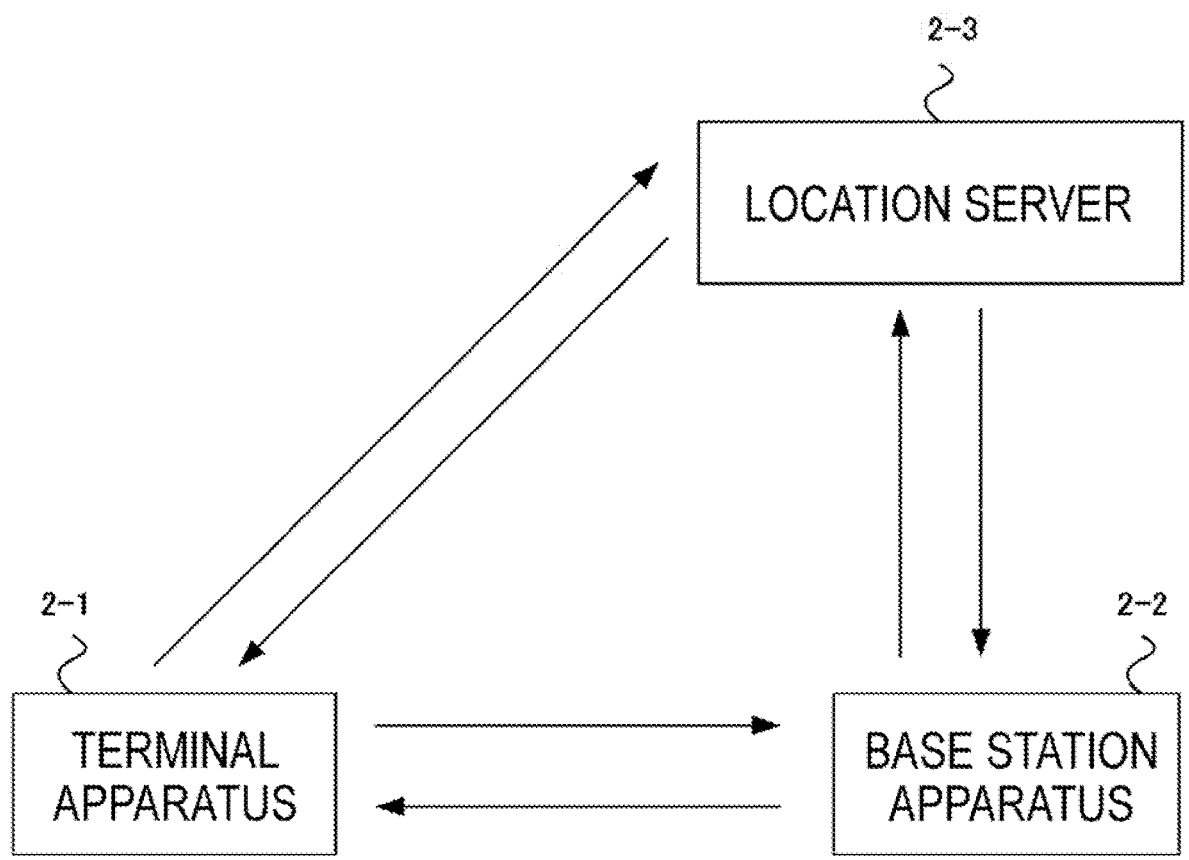
FIG. 2 is a diagram illustrating the example of the communication system according to the present embodiment.

FIG. 2 is a diagram illustrating an example of a communication system according to the present embodiment. As illustrated in FIG. 2, the communication system according to the present embodiment includes a terminal apparatus 2-1, a base station apparatus 2-2, and a location server 2-3. Note that the simple reference to the term "base station apparatus" indicates a base station apparatus 1A and/or a base station apparatus 2-2 if not otherwise specified. Furthermore, note that the simple reference to the term "terminal apparatus" indicates a terminal apparatus 2 and/or a terminal apparatus 2-1 if not otherwise specified.

The terminal apparatus 2-1 transmits an uplink signal needed for measurement of the position of an uplink-based terminal apparatus. The terminal apparatus 2-1 receives a downlink signal from the base station apparatus 2-2 to perform position-related measurement. The terminal apparatus 2-1 receives signals from a Global Navigation Satellite System (GNSS) and a Terrestrial Beacon System (TBS) to perform position-related measurement. The terminal apparatus 2-1 transmits a position estimated value or a result of position measurement to the location server 2-3. The position estimated value includes coordinate information. The coordinate information includes latitude, longitude, and altitude (elevation above sea level). Furthermore, the result of position measurement is information to be used by the location server 2-3 to determine the position estimated value.

The base station apparatus 2-2 communicates, to the location server 2-3, a result of the measurement of a radio signal to and from a target terminal apparatus. The base station apparatus 2-2 can request transmission of SRS from the terminal apparatus 2-1 in order to perform uplink position measurement.

The location server 2-3 estimates the position of the terminal apparatus or transmits assist data for position measurement to the terminal apparatus. The location server 2-3 can operate with the base station apparatus 2-2 to acquire the position estimated value of the terminal apparatus 2-1.

The communication system according to the present embodiment uses one or more of Network-assisted GNSS (A-GNSS), Observed Time Differential Of Arrival (OTDOA), Enhanced Cell ID (ECID), Uplink Time Differential Of Arrival (UTDOA), a barometric sensor method, a Wireless Local Area Network (WLAN) method, a BlueTooth (registered trademark, BT) method, a TBS method, and the like to estimate the position of the terminal apparatus. Using these methods, the terminal apparatus 2-1 or the base station apparatus 2-2 or the location server 2-3 estimates the position of the terminal apparatus 2-1. The location server 2-3 manages positional information about the terminal apparatus 2-1.

In A-GNSS, the terminal apparatus 2-1 receives assist information from the location server 2-3 to estimate the position using a GNSS signal. The A-GNSS assist information includes some or all of an ionosphere model, a coordinate conversion parameter, an ephemeris, and an almanac. The almanac is information used to know an approximate GNSS satellite position and includes some or all of a satellite ID, time information, a week number, and satellite orbit information. The ephemeris is information used to determine the position of the GNSS satellite and includes some or all of time information, a positional parameter for a satellite, and a compensation parameter for a satellite synchronized clock.

OTDOA is a position estimation method for the downlink and involves estimating the position of the terminal apparatus 2-1 utilizing timing of reception of downlink signals from multiple base station apparatuses. The location server 2-3 transmits (communicates) OTDOA assist information to the terminal apparatus 2-1. The OTDOA assist information includes some or all of OTDOA reference cell information, an OTDOA neighbor cell information list, and OTDOA errors. The OTDOA reference cell information includes some or all of a carrier frequency, the cell ID, the CP length, and PRS information. The CP length indicates whether the CP is the normal cyclic prefix or the extended cyclic prefix longer than the normal cyclic prefix. The PRS information includes some or all of a bandwidth, a PRS configuration index, a number of consecutive subframes, and PRS muting information. The PRS configuration index is information indicative of a period of each PRS subframe and an offset value of each PRS subframe. The bandwidth indicates the bandwidth at which PRS is transmitted, and is expressed in the number of resource blocks. For example, the number of resource blocks indicating the bandwidth is 6, 15, 25, 50, 75, or 100. The number of consecutive subframes indicates the number of PRS subframes consecutively transmitted. For example, the number of subframes consecutively transmitted is 1, 2, 4, or 6. A leading subframe of the consecutive subframes is determined based on the period of each PRS subframe and the offset value of each PRS subframe. The PRS muting information indicates a PRS muting configuration for the cell. The PRS muting configuration indicates whether PRS is to be transmitted in one subframe in one cell.

The OTDOA neighbor cell information list includes one or more pieces of OTDOA neighbor frequency information. The OTDOA neighbor frequency information includes one or more pieces of OTDOA neighbor cell information. The OTDOA neighbor cell information includes some or all of the cell ID, the carrier frequency, the CP length, the PRS information, the number of CRS antenna ports, a slot number offset, a PRS subframe offset, an expected RSTD, and uncertainty of the expected RSTD. The slot number offset indicates the offsets of the slot numbers between the cell and a reference cell. The PRS subframe offset indicates the offset between a leading PRS subframe in the reference cell and a leading PRS subframe at a carrier frequency different from the carrier frequency of the reference cell. The Reference Signal Time Difference (RSTD) indicates a difference in reception timing between the neighbor cell and the reference cell. For the expected RSTD, an expected propagation time difference between the cell and the reference cell is taken into account. The uncertainty of the expected RSTD indicates values (errors) that may be taken by the expected RST. The terminal apparatus 2-1 can measure the RSTD within a range determined based on the expected RSTD and the uncertainty of the expected RSTD.

The location server 2-3 requests OTDOA information from the base station apparatus 2-2. In other words, the base station apparatus 2-2 transmits (provides) the OTDOA information to the location server 2-3 in response to the request made by the location server 2-3. The OTDOA information includes one or more pieces of OTDOA cell information. The OTDOA cell information includes some or all of the physical cell ID, the carrier frequency, the PRS bandwidth, the PRS configuration index, the CP length, the number of consecutive subframes in which PRS is transmitted, the number of CRS antenna ports, coordinates of antennas at the base station apparatus/access point, and the PRS muting configuration. The coordinates of the antennas at the base station apparatus/access point indicate the latitude, the longitude, an elevation (the elevation above sea level, the altitude), information indicating whether the coordinates correspond to north latitude or south latitude, and information indicating the direction of the elevation. The direction of the elevation indicates the elevation or a depth.

The terminal apparatus 2-1 transmits (communicates) OTDOA signal measurement information to the location server 2-3. The OTDOA signal measurement information includes some or all of the cell ID of the reference cell and the carrier frequency of the reference cell, and a neighbor measurement list. The neighbor measurement list is a list including RSTDs for neighbor cells, and includes one or more neighbor measurement elements. The neighbor measurement elements include some or all of the cell IDs, the carrier frequencies, and the RSTDs of the neighbor cells.

The location server 2-3 uses the OTDOA signal measurement information received (provided) from the terminal apparatus 2-1 to estimate the position of the terminal apparatus 2-1.

ECID is a method for estimating the position of the terminal apparatus 2-1 based on information about the serving cell, a distance from the serving cell, and a direction from the serving cell. The terminal apparatus 2-1 transmits (communicates, provides) ECID signal measurement information to the location server 2-3. The ECID signal measurement information includes some or all of a result of measurement of a primary cell and a measurement result list. The result of the measurement of the primary cell includes the measurement result elements. The measurement result list includes one or more measurement result elements. The measurement result elements include some or all of the cell ID, Reference Signal Received Power (RSRP), Reference Signal Received Quality (RSRQ), and a reception and transmission time difference. RSRP is determined from an average of power of received CRSs within a frequency band to be measured. RSRQ is determined by $N°_{RB} \times RSRP/RSSI$. $N°_{RB}$ denotes the number of resource blocks. The resource block is a resource defined by a prescribed number of subcarriers and a prescribed number of symbols. Furthermore, the Received Signal Strength Indicator (RSSI) is determined by average received power in certain OFDM symbols in a measured subframe in a measured bandwidth. RSSI includes signals from the serving cell and non-serving cell on the same channel, and interference or thermal noise from neighbor channels. In addition, the base station apparatus 2-2 transmits (communicates), to the location server 2-3, some or all of timing advance, an Angle of Arrival (AOA) of an uplink signal from the terminal apparatus 2-1, the cell ID, RSRP reported from the terminal apparatus 2-1, and RSRQ reported from the terminal apparatus 2-1. The timing advance includes a type 1 and a type 2. The timing advance type 1 is determined by adding together a time difference between reception, at the base station apparatus 2-2, of a signal from the terminal apparatus 2-1 and transmission from the terminal apparatus 2-1 and a time difference between reception and transmission at the terminal apparatus 2-1. The timing advance type 2 is a time difference between reception and transmission at the base station apparatus 2-2, the time difference corresponding to an uplink radio frame including PRACHs received from a plurality of terminal apparatuses.

UTODA is position estimation for the uplink and involves estimating the position of the terminal apparatus 2-1 utilizing timing of reception, at multiple base station apparatuses, of an uplink signal from the terminal apparatus 2-1. The base station apparatus 2-2 transmits (communicates) some or all of the cell ID, the timing advance, and SRS information to the location server 2-3. The SRS information includes some or all of the cell ID, the uplink cyclic prefix, the uplink bandwidth of the cell, the bandwidth of a cell-specific SRS, the bandwidth of a terminal-specific SRS, the number of SRS antenna ports, an SRS frequency hopping bandwidth, an SRS cyclic shift, an SRS transmission comb, and mapping information of a frequency domain. The SRS transmission comb indicates mapping information at a subcarrier level. The base station apparatus 2-2 transmits the SRS information to the terminal apparatus 2-1.

The barometric sensor method involves mainly estimating the position in the elevation direction using barometric information of the terminal apparatus 2-1. The terminal apparatus 2-1 transmits (communicates), to the location server 2-3, some or all of a result of measurement by the barometric sensor, a time stamp, and a terminal apparatus position estimated value based on the barometric sensor.

Furthermore, the WLAN method involves estimating, by the terminal apparatus 2-1 or the location server 2-3, the position of the terminal apparatus 2-1 using a database and a result of measurement of a reception signal from the WLAN. The terminal apparatus 2-1 transmits (communicates), to the location server 2-3, Service Set Identity (SSID), Basic Service Set Identity (BSSID), RSSI of an access point, a roundtrip time, a time stamp at the time of measurement/position estimation, a terminal position estimated value, and information indicating whether the access point is a serving access point or a non-serving access point.

Furthermore, the BT method involves estimating the position of the terminal apparatus 2-1 using a result of measurement of a reception signal from BT. The terminal apparatus 2-1 transmits (communicates), to the location server 2-3, some or all of a Media Access Control (MAC) address, RSSI of a beacon, the time stamp at the time of measurement/position estimation, and the position estimated value of the terminal apparatus 2-1.

The TBS method involves receiving, by the terminal apparatus 2-1, a broadcast signal intended for position estimation to estimate the position. The terminal apparatus 2-1 transmits (communicates) the position estimated value of the terminal apparatus 2-1, the time stamp at the time of position estimation, a result of TBS measurement, and measurement quality to the location server 2-3.

The terminal apparatus 2-1 transmits (communicates) the capability of any of the above-described position estimation methods supported by the terminal apparatus 2-1, to the location server 2-3 in accordance with a request made by the location server 2-3. In a case that the terminal apparatus 2-1 supports OTDOA, the system bandwidth supported by the terminal apparatus 2-1 is included in the capability of OTDOA, which is then transmitted (communicated).

Figure 3:
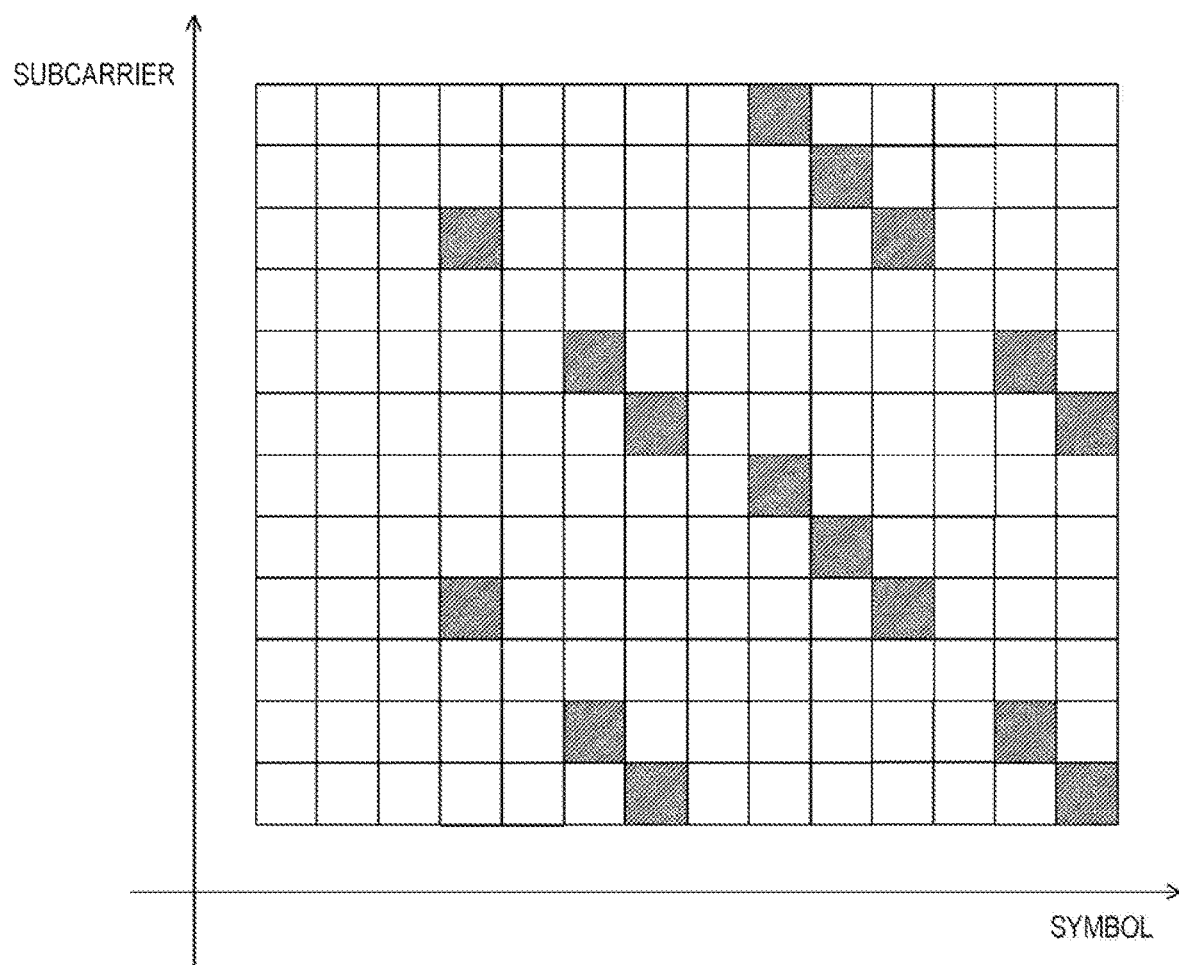
FIG. 3 is a diagram illustrating an example of mapping of a positioning reference signal according to the present embodiment.
Figure 4:
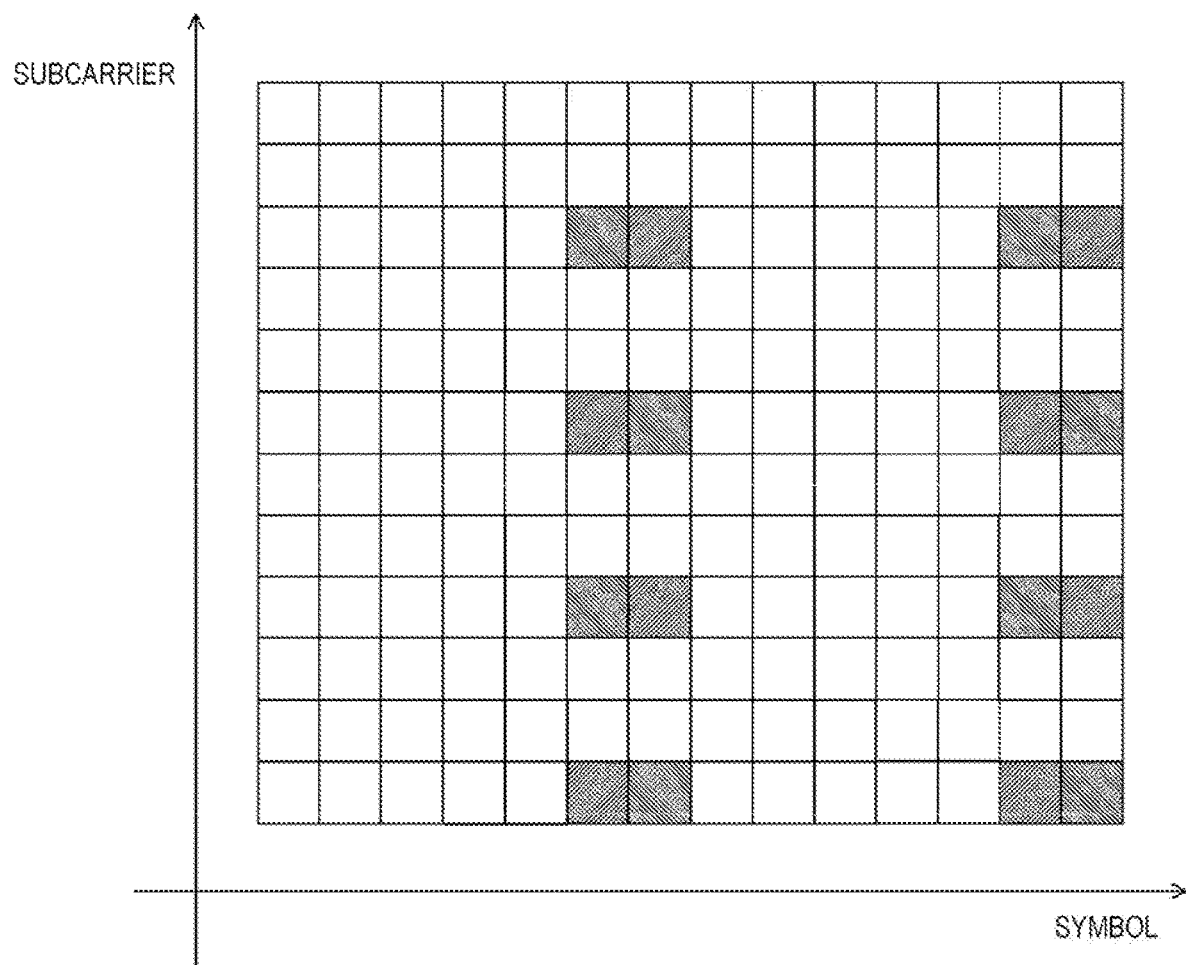
FIG. 4 is a diagram illustrating an example of mapping of a narrowband reference signal according to the present embodiment.
Figure 5:
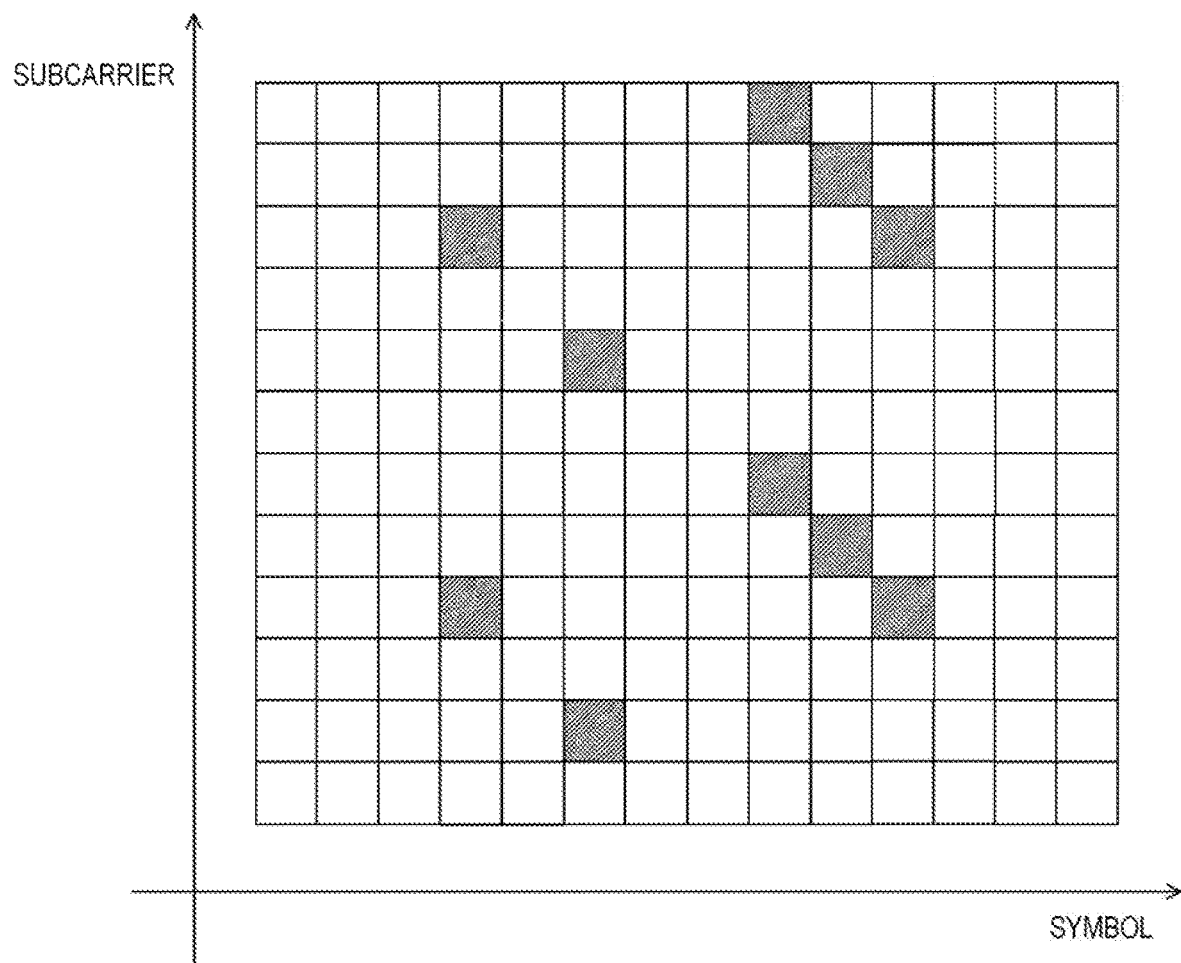
FIG. 5 is a diagram illustrating an example of mapping of the narrowband positioning reference signal according to the present embodiment.
Figure 6:
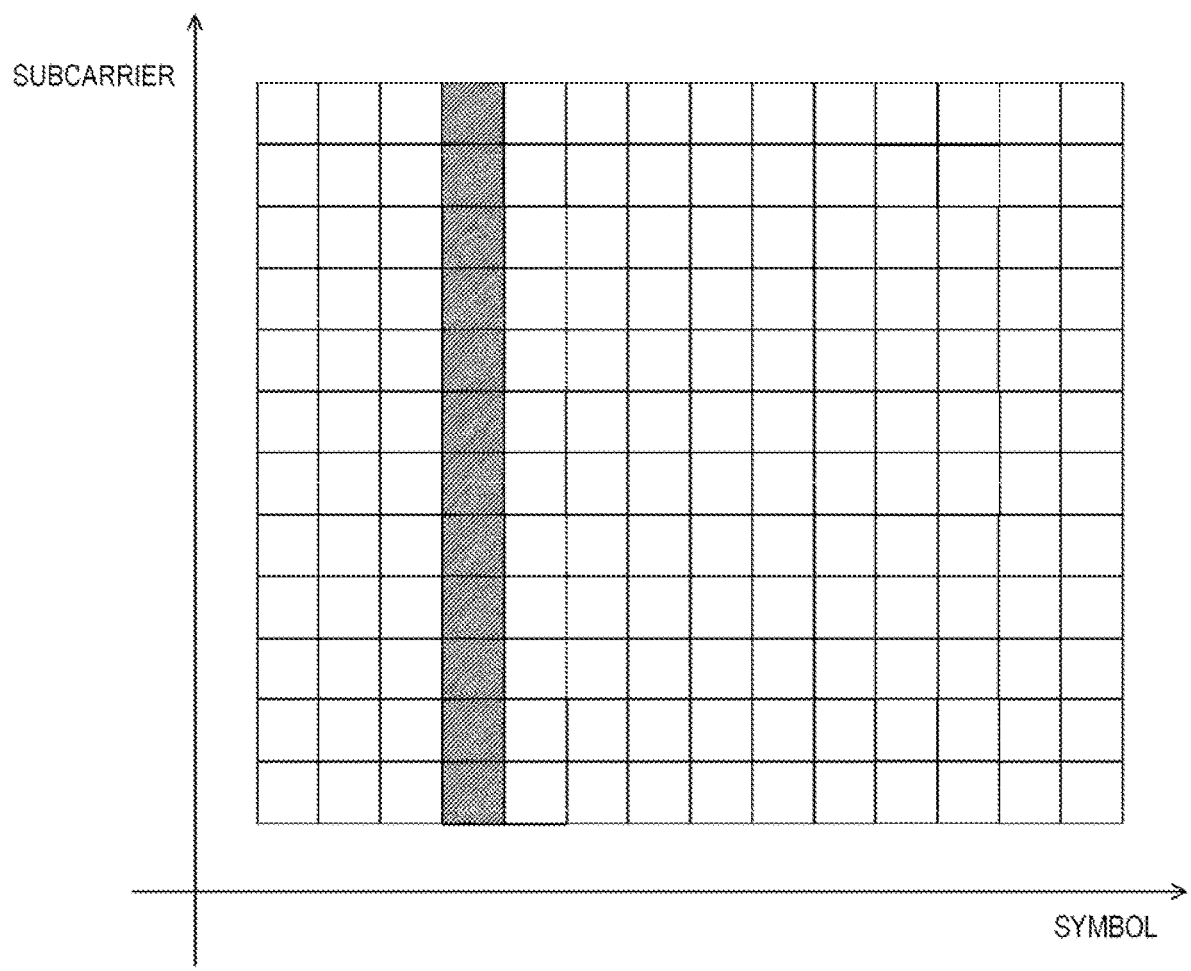
FIG. 6 is a diagram illustrating an example of mapping of the narrowband positioning reference signal according to the present embodiment.

Narrowband terminals have a narrow system bandwidth and may thus have degraded position estimation accuracy. The position estimation accuracy thus needs to be prevented from decreasing even in a case of a narrow system bandwidth. In a case that the terminal apparatus 2-1 is a narrowband terminal and estimates the position using OTDOA, the base station apparatus 2-2 can transmit a narrowband PRS (NPRS). For mitigated interference, NPRS can be PRS in OFDM symbols other than OFDM symbols in which NRS is transmitted. FIG. 3 illustrates an example of mapping of PRS. In FIG. 3, each square represents a resource element, and resource elements hatched by upper-right-to-lower-left lines represent PRS. FIG. 4 illustrates an example of mapping of NRS at an antenna port 0 in a case of 2 antenna ports. In FIG. 4, resource elements hatched by upper-right-to-lower-left lines represent NRS transmitted through the antenna port 0. Resource elements hatched by upper-left-to-lower-right lines represent resources not used by the antenna port 0 (the signal is not transmitted by the antenna port 0) because NRS is transmitted by an antenna port 1. FIG. 5 illustrates an example of mapping of NPRS. In FIG. 5, resource elements hatched by upper-right-to-lower-left lines represent NPRS. FIG. 6 illustrates an example of mapping of NPRS. In the example in FIG. 6, the narrowband causes NPRS to be mapped to a reduced number of subcarriers in a frequency direction, and thus, frequency density is increased for mapping. Furthermore, a time density is reduced to mitigate interference from neighbor cells. Note that FIG. 6 illustrates the example where NPRS is mapped to only one OFDM symbol but may be mapped to multiple OFDM symbols. Furthermore, in a case that the base station apparatus 2-2 transmits NPRS in consecutive subframes/symbols, NPRS can be varied between a positive sign and a negative sign for each subframe/each symbol in a prescribed pattern. The pattern of the positive and negative signs is determined based on some or all of the cell ID, the narrowband cell ID, and the ID of NPRS.

An NPRS sequence can be a pseudo-random sequence. Furthermore, an initial value for a pseudo-random sequence for generation of an NPRS sequence is calculated based on some or all of the narrowband cell ID, a slot number, OFDM symbol numbers in a slot, and the ID of NPRS. The base station apparatus can transmit PRS using the normal cyclic prefix and the extended cyclic prefix. On the other hand, the base station apparatus can transmit NRS using only the normal cyclic prefix. To avoid shortening the NPRS sequence, the OFDM symbol numbers in the slot can avoid being taken into account for the initial value for the pseudo-random sequence. In this case, the pseudo-random sequence is initialized for each slot. Furthermore, the base station apparatus determines whether to take the OFDM symbol numbers into account for the pseudo-random sequence depending on the frequency density of NPRSs. For example, in a case where NPRSs are mapped to two of the 12 subcarriers, the base station apparatus avoids taking the OFDM symbol numbers into account for the initial value of the pseudo-random sequence. For example, in a case where NPRSs are mapped to 12 of the 12 subcarriers, the base station apparatus takes the OFDM symbol numbers into account for the initial value of the pseudo-random sequence. At this time, the terminal apparatus determines, depending on the frequency density of NPRSs, whether the OFDM symbol numbers are taken into account for the pseudo-random sequence for generation of an NPRS sequence, and uses the NPRS sequence to determine RSTD.

For equivalent position estimation accuracy, a PRS sequence length can be the same as an NPRS sequence length. Furthermore, in view of the position estimation accuracy and power consumption, the NPRS sequence length can be set smaller than the PRS sequence length. In addition, the NPRS sequence length is set larger than the PRS sequence length to enable an increase in accuracy per sequence. In this case, the total number of sequences/total number of subframes, used for calculation of RSTD, allow trade-off between the position estimation accuracy and power consumption to be taken into account.

The location server 2-3 can transmit (communicate) OTDOA assist information (narrowband OTDOA assist information) to the narrowband terminal apparatus. The narrowband OTDOA assist information includes some or all of narrowband OTDOA reference cell information, a narrowband OTDOA neighbor cell information list, and narrowband OTDOA errors. The narrowband OTDOA reference cell information includes some or all of the carrier frequency, the cell ID, the narrowband cell ID, the CP length, and NPRS information. The NPRS information includes some or all of a an NPRS configuration index, the number of consecutive subframes, NPRS muting information, NPRS resource allocation information, the number of subcarriers to which NPRS is mapped, and a center frequency of the NPRS. The NPRS configuration index is information indicative of a period of each NPRS subframe and an offset value of each NPRS subframe. The number of consecutive subframes indicates the number of NPRS subframes consecutively transmitted. The NPRS resource allocation information is information indicative of resource blocks on which NPRS is mapped. Information indicative of resource blocks can be indexes of one or more resource blocks. The number of subcarriers to which NPRS is mapped represents the frequency density of frequencies mapped in a single OFDM symbol in one slot. The frequency density can indicate the number of subcarriers included in the 12 subcarriers and that are to be allocated. Note that the frequency density may be information indicative of one of a number predetermined patterns. The patterns of the frequency density can include some or all of, e.g., 2 subcarriers, 4 subcarriers, 6 subcarriers, and 12 subcarriers. NPRS is transmitted in a narrower bandwidth than PRS and can thus be transmitted over a long time to prevent the position estimation accuracy from being degraded. Therefore, the base station apparatus 2-2 can make, for the terminal apparatus 2-1, the maximum number of consecutive subframes in which NPRS can be configured larger than the maximum number of consecutive subframes in which PRS can be configured. Furthermore, the base station apparatus 2-2 can make, for the terminal apparatus 2-1, the minimum number of consecutive subframes in which NPRS can be configured larger than the minimum number of consecutive subframes in which PRS can be configured. For example, the minimum number of consecutive subframes of NPRS can be 6, and the maximum number of consecutive subframes of NPRS can be 36. A leading subframe of the consecutive subframes is determined based on the period of each NPRS subframe and the offset value of each NPRS subframe. The NPRS muting information indicates NPRS muting configuration for the cell. The NPRS muting configuration indicates whether NPRS is to be transmitted in one subframe in one cell. Note that the number of consecutive subframes can be associated with the frequency density. For example, in a case that the frequency density indicates two subcarriers, the minimum number of consecutive subframes can be 6, and the maximum number of consecutive subframes can be 36. For example, in a case that the frequency density indicates four subcarriers, the minimum number of consecutive subframes can be 3, and the maximum number of consecutive subframes can be 16. For example, in a case that the frequency density indicates six subcarriers, the minimum number of consecutive subframes can be 2, and the maximum number of consecutive subframes can be 12. For example, in a case that the frequency density indicates 12 subcarriers, the minimum number of consecutive subframes can be 1, and the maximum number of consecutive subframes can be 6. In this case, the value indicative of the number of consecutive subframes may vary according to the frequency density. Furthermore, a candidate for the number of consecutive subframes in a case that the frequency density is two, four, or six subcarriers can be an integral multiple of a candidate for the number of consecutive subframes in a case that the frequency density is 12 subcarriers.

The narrowband OTDOA neighbor cell information list includes one or more pieces of narrowband OTDOA neighbor frequency information. The narrowband OTDOA neighbor frequency information includes one or more pieces of narrowband OTDOA neighbor cell information. The narrowband OTDOA neighbor cell information includes some or all of the cell ID, the narrowband cell ID, the carrier frequency, the CP length, the NPRS information, the number of CRS antenna ports, the slot number offset, an NPRS subframe offset, the expected RSTD, and uncertainty of the expected RSTD. The NPRS subframe offset indicates the offset between the leading NPRS subframe in the reference cell and the leading subframe at a carrier frequency different from the carrier frequency of the reference cell.

The location server 2-3 requests narrowband OTDOA information from the base station apparatus 2-2. In other words, the base station apparatus 2-2 transmits (provides) the narrowband OTDOA information to the location server 2-3 in response to the request made by the location server 2-3. The narrowband OTDOA information includes one or more pieces of narrowband OTDOA cell information. The narrowband OTDOA cell information includes some or all of the narrowband cell ID, the carrier frequency, the NPRS bandwidth, the configuration index, the CP length, the number of consecutive subframes in which NPRS is transmitted, the number of CRS antenna ports, the coordinates of the antennas at the base station apparatus/access point, and the NPRS muting configuration. The coordinates of the antennas at the base station apparatus/access point indicate the latitude, the longitude, the elevation (the elevation above sea level), information indicating whether the coordinates correspond to north latitude or south latitude, and information indicating the direction of the elevation. The direction of the elevation indicates the elevation or a depth.

The base station apparatus 2-2, in a case of using UTDOA to estimate the position of the narrowband terminal, can use an uplink narrowband reference signal. The uplink narrowband reference signal is, e.g., a Narrowband Sounding Reference Signal (NSRS) or DMRS. The narrowband terminal can transmit an uplink signal on one or more subcarriers. Note that each of one or more subcarriers is referred to as a single-tone or a multi-tone. The NSRS sequence may vary between the single-tone and the multi-tone.

The base station apparatus 2-2 transmits (communicates) some or all of the narrowband physical cell ID, the NSRS information, and the timing advance to the location server 2-3. The NSRS information includes the uplink cyclic prefix, the uplink bandwidth of the cell, information indicating whether the subcarrier is a single-tone or a multi-tone, the number of NSRS antenna ports, an NSRS frequency hopping bandwidth, an NSRS cyclic shift, an NSRS transmission comb, mapping information of the frequency domain, and the number of repetitions. The NSRS transmission comb may indicate mapping of subcarriers. The number of repetitions is the number of repetitions of NSRS transmissions for extension of the coverage. The base station apparatus 2-2 transmits NSRS information to the narrowband terminal. The narrowband terminal transmits NSRS to the base station apparatus 2-2.

Figure 7:
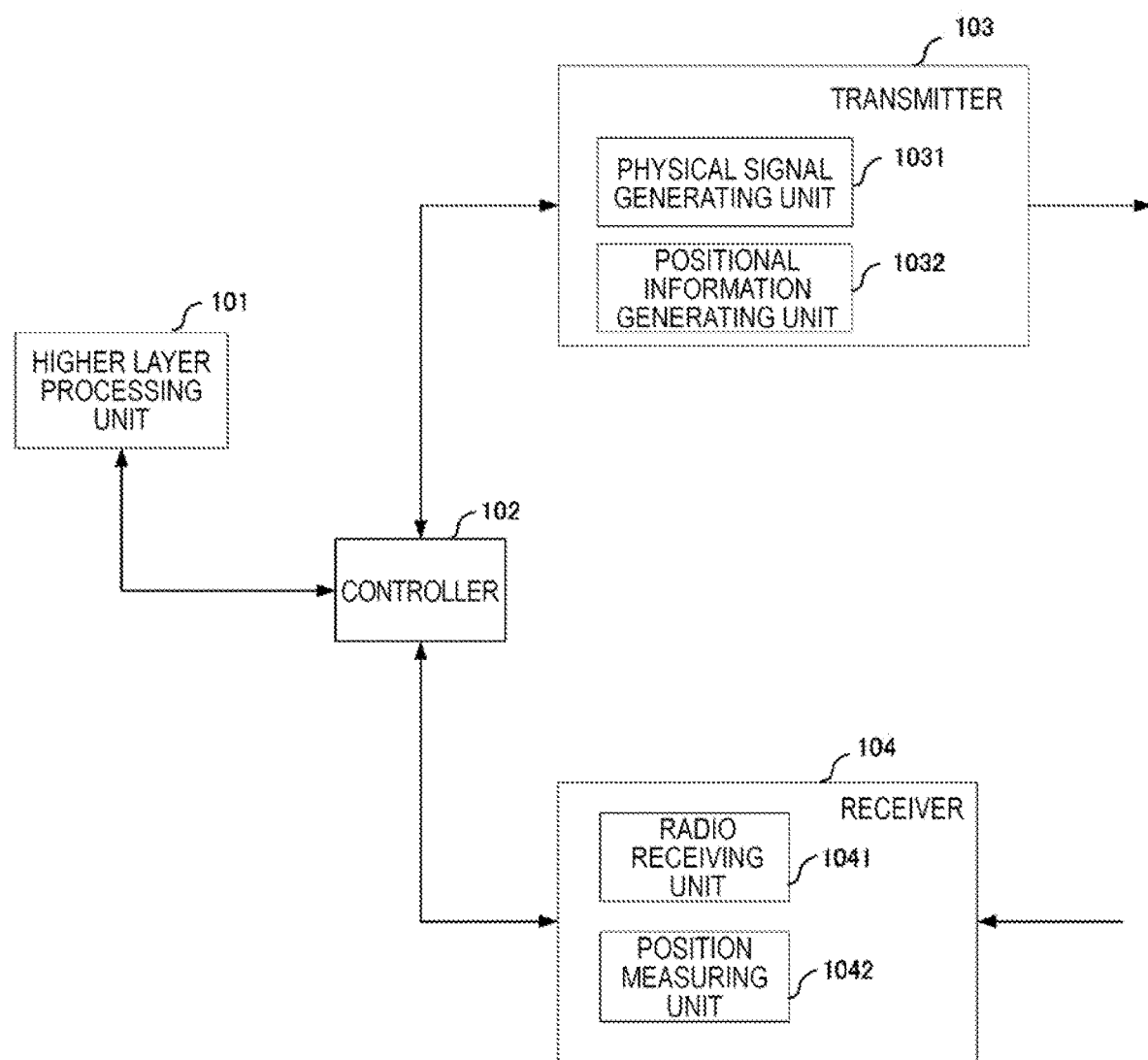
FIG. 7 is a schematic block diagram illustrating a configuration example of a base station apparatus according to the present embodiment.

FIG. 7 is a schematic block diagram illustrating a configuration example of the base station apparatus according to the present embodiment. As illustrated in FIG. 7, the base station apparatus 1A is configured to include a higher layer processing unit (higher layer processing step) 101, a controller (controlling step) 102, a transmitter (transmitting step) 103, and a receiver (receiving step) 104. The transmitter 103 is configured to include a physical signal generating unit (physical signal generating step) 1031 and a positional information generating unit (positional information generating step) 1032. The receiver 104 is configured to include a radio receiving unit (radio receiving step) 1041 and a position measuring unit (position measuring step) 1042. Note that, although not illustrated in the drawings, the transmitter 103 may include a transmit antenna. Note that, although not illustrated in the drawings, the receiver 104 may include a receive antenna. Furthermore, the transmit antenna may be the same as the receive antenna.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as UE capability of the terminal apparatus or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the stated terminal apparatus transmits information (parameters) indicating whether the prescribed function is supported. In a case where a terminal apparatus does not support a prescribed function, the stated terminal apparatus does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The higher layer processing unit 101 generates or acquires, from a higher node, downlink data (transport block), system information, an RRC message, MAC CE, and the like. The higher layer processing unit 101 outputs the downlink data to the transmitter 103, and outputs other information to the controller 102. Furthermore, the higher layer processing unit 101 manages various configuration information of the terminal apparatuses.

The higher layer processing unit 101 determines frequencies and subframes to which the physical channels are allocated, a coding rate and a modulation scheme (or MCS) for the physical channels, transmit power, and the like. The higher layer processing unit 101 outputs the determined information to the controller 102.

The higher layer processing unit 101 generates information to be used for scheduling of the physical channels, based on a result of the scheduling. The higher layer processing unit 101 outputs the generated information to the controller 102.

Based on the information input from the higher layer processing unit 101, the controller 102 generates a control signal for controlling of the transmitter 103 and the receiver 104. The controller 102 generates the downlink control information based on the information input from the higher layer processing unit 101, and outputs the generated information to the transmitter 103.

The transmitter 103 generates a downlink reference signal in accordance with the control signal input from the controller 102, codes and modulates the HARQ indicator, the downlink control information, and the downlink data that are input from the higher layer processing unit 101, multiplexes the downlink physical channels and the downlink reference signal, and transmits a signal obtained through the multiplexing to the terminal apparatus 2 through the transmit and receive antenna.

The physical signal generating unit 1031 generates an OFDM signal from the HARQ indicator, the downlink control information, the downlink reference signal, and the downlink data input from the higher layer processing unit 101. The cyclic prefix (CP) is added to the OFDM signal to generate a baseband digital signal. The baseband digital signal is converted into an analog signal. Excess frequency components are removed from the analog signal by filtering. The filtered signal is upconverted to have a carrier frequency and is power-amplified. The resultant signal is transmitted from the transmit antenna.

The positional information generating unit 1032 generates a signal used to transmit (communicate), to the location server, the position measured (estimated) by the receiver 104. The transmitter 103 communicates with the location server through a wired or wireless connection.

In accordance with the control signal input from the controller 102, the radio receiving unit 1041 demultiplexes, demodulates, and decodes a reception signal received from the terminal apparatus, and outputs information resulting from the decoding to the higher layer processing unit 101 or the position measuring unit 1042. Furthermore, the position measuring unit 1042 measures the position based on a reference signal received from the terminal apparatus and used for position measurement.

The radio receiving unit 1041 converts, by down-converting, an uplink signal received through the receive antenna into a baseband signal, removes unnecessary frequency components, controls an amplification level in such a manner as to suitably maintain a signal level, orthogonally demodulates the received signal based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) on the signal from which CP has been removed, and extracts a signal in the frequency domain. The radio receiving unit 1041 demultiplexes the extracted signal in the frequency domain into signals such as the uplink physical channel and the uplink reference signal. The radio receiving unit 1041 outputs a signal relating to position estimation to the position measuring unit 1042.

The radio receiving unit 1041 performs Inverse Discrete Fourier Transform (IDFT) on PUSCH/NPUSCH to acquire a modulation symbol and demodulates the reception signal.

The radio receiving unit 1041 decodes the coded bits, which have been demodulated, at the coding rate in compliance with a coding scheme prescribed in advance, the coding rate being prescribed in advance or being notified in advance with an uplink grant to the terminal apparatus 2 by the base station apparatus itself, and outputs the decoded uplink data and uplink control information to the higher layer processing unit 101. In a case that PUSCH is retransmitted, the decoding unit 1044 performs the decoding with the coded bits input from the higher layer processing unit 101 and retained in an HARQ buffer, and the demodulated coded bits.

Figure 8:
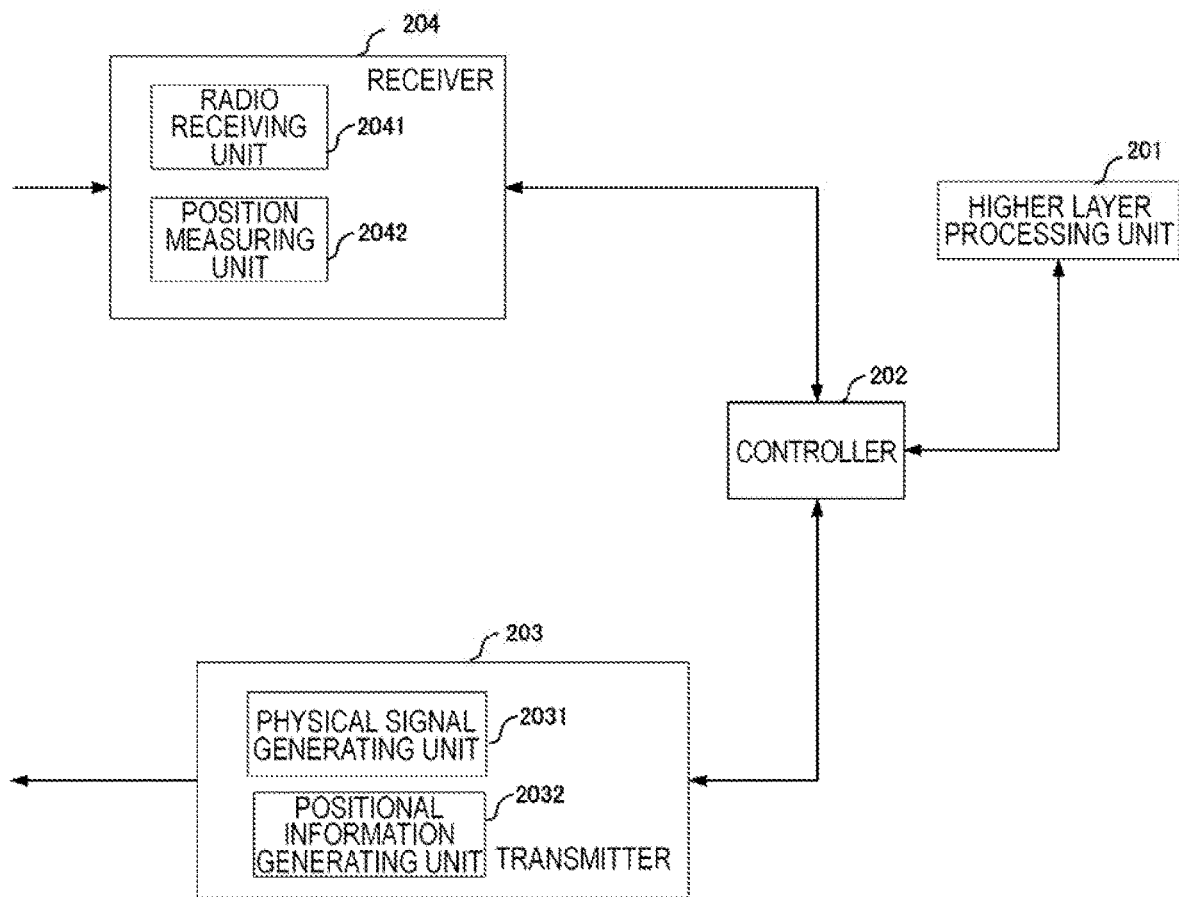
FIG. 8 is a schematic block diagram illustrating a configuration example of a terminal apparatus according to the present embodiment.

FIG. 8 is a schematic block diagram illustrating a configuration of the terminal apparatus according to the present embodiment. As illustrated in FIG. 8, the terminal apparatus is configured to include a higher layer processing unit (higher layer processing step) 201, a controller (controlling step) 202, a transmitter (transmitting step) 203, and a receiver (receiving step) 204. Furthermore, the transmitter 203 is configured to include a physical signal generating unit (physical signal generating step) 2031 and a positional information generating unit (positional information generating step) 2032. In addition, the receiver 204 is configured to include a radio receiving unit (radio receiving step) 2041 and a position measuring unit (position measuring step) 2042.

The higher layer processing unit 201 outputs the uplink data (the transport block) generated by a user operation or the like, to the transmitter 203. The higher layer processing unit 201 also performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information indicating a terminal apparatus function supported by the terminal apparatus itself.

The higher layer processing unit 201 manages various configuration information of the terminal apparatuses itself. The higher layer processing unit 201 also generates information to be mapped to each uplink channel, and outputs the generated information to the transmitter 203.

The higher layer processing unit 201 acquires configuration information of CSI feedback transmitted from the base station apparatus, and outputs the acquired information to the controller 202.

The higher layer processing unit 201 interprets the downlink control information received through the receiver 204, and determines scheduling information. The higher layer processing unit 201 also generates the control information in order to control the receiver 204 and the transmitter 203 in accordance with the scheduling information, and outputs the generated information to the controller 202.

The higher layer processing unit 201 interprets the assist data obtained from the location server 2-3 and relating to position measurement, and outputs the assist data to the controller 202.

Based on the information input from the higher layer processing unit 201, the controller 202 generates a control signal for controlling of the receiver 204 and the transmitter 203. The controller 202 outputs the generated control signal to the receiver 204 and the transmitter 203 to control the receiver 204 and the transmitter 203.

In accordance with the control signal input from the controller 202, the receiver 204 demultiplexes, demodulates, and decodes a reception signal received from the base station apparatus through the receive antenna, and outputs the resulting information to the higher layer processing unit 201.

The radio receiving unit 2041 converts, by down-converting, a downlink signal received through the transmit and receive antenna into a baseband signal, removes unnecessary frequency components, controls an amplification level in such a manner as to suitably maintain a signal level, orthogonally demodulates the received signal based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform on the signal from which CP has been removed, and extracts a signal in the frequency domain. The radio receiving unit 2041 demultiplexes the extracted signal into the downlink physical channel and the downlink reference signal. Furthermore, the radio receiving unit 2041 performs channel compensation on the downlink physical channels based on a channel estimation value of the desired signal obtained from the channel measurement, detects the downlink control information, and outputs the information to the controller 202.

The radio receiving unit 2041, using the channel estimation value, detects a signal, and outputs the detected signal to the higher layer processing unit 201.

The position measuring unit 2042 uses one or more position estimating methods to determine a position estimated value or a result of position measurement and outputs the position estimated value or the result of position measurement to the controller 202. The position measuring unit 2042 also uses the assist data relating to position estimation to determine the position estimated value or the result of position measurement and outputs the position estimated value or the result of position measurement to the controller 202.

The transmitter 203 generates the uplink reference signal in accordance with the control signal input from the controller 202, codes and modulates the uplink data (the transport block) input from the higher layer processing unit 201, multiplexes the uplink physical channels such as the control channel and shared channels and the generated uplink reference signal, and transmits a result of the multiplexing to the base station apparatus through the transmit antenna.

The transmitter 203 also transmits (communicates) the position estimated value or the result of position measurement to the location server 2-3.

The physical signal generating unit 2031 generates an SC-FDMA symbol from the uplink control information, the uplink data, and the uplink reference signal. The CP is added to the SC-FDMA symbol to generate a baseband digital signal. The baseband digital signal is converted into an analog signal. Excess frequency components are removed from the analog signal. The filtered signal is upconverted to have a carrier frequency and is power-amplified. The resultant signal is transmitted.

Note that the terminal apparatus is not limited to the SC-FDMA scheme but may perform modulation based on the ODMA scheme.

Figure 9:
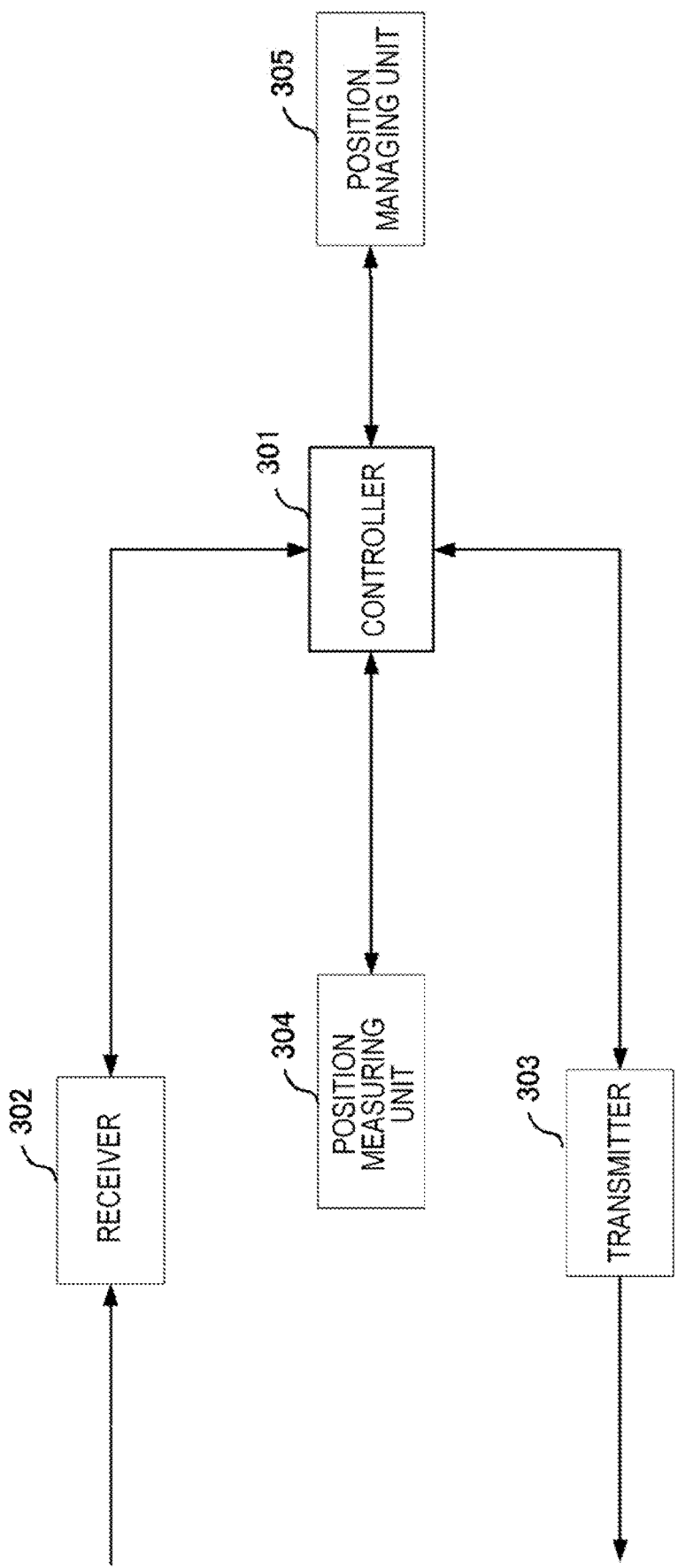
FIG. 9 is a schematic block diagram illustrating a configuration example of a location server according to the present embodiment.

FIG. 9 is a schematic block diagram illustrating a configuration example of the location server 2-3. The location server 2-3 is configured to include a controller (controlling step) 301, a receiver (receiving step) 302, a transmitter (transmitting step) 303, a position measuring unit (position measuring step) 304, a position managing unit (position managing step) 305.

The controller 301 controls the receiver 302, the transmitter 303, the position measuring unit 304, and the position managing unit 305.

The receiver 302 receives the position estimated value or the result of position measurement from the base station apparatus and/or the terminal apparatus, and outputs the position estimated value or the result of position measurement to the controller 301.

The controller 301 outputs the result of position measurement to the position measuring unit 304. The position measuring unit 304 uses the result of position measurement to determine the position estimated value and outputs the position estimated value to the controller 301. The controller 301 outputs, to the position managing unit 305, the position estimated value input from the receiver 302 or the position measuring unit 304.

The controller 301 outputs the assist data relating to position measurement to the transmitter 303. The transmitter 303 transmits (communicates) the assist data relating to position measurement to the terminal apparatus.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM) or a non-volatile memory such as a flash memory, or a Hard Disk Drive (HDD), or any other storage device system.

Note that a program for realizing the functions of the embodiment associated with the present invention may be recorded in a computer readable recording medium. The functions may be realized by causing a computer system to load and perform the program recorded in the recording medium. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium actively retaining the program for a short time, or any other computer readable recording medium.

Furthermore, each functional block or various characteristics of the apparatuses used in the above-described embodiment may be implemented or performed on an electric circuit, e.g., an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a processor of known type, a controller, a micro-controller, or a state machine. The above-mentioned electric circuit may be constituted of a digital circuit or may be constituted of an analog circuit. Furthermore, in a case that, due to advances in semiconductor technology, a circuit integration technology that replaces the present integrated circuits is developed, one or more aspects of the present invention can use a new integrated circuit based on the circuit integration technology.

Note that the invention of the present patent application is not limited to the above-described embodiments. In the embodiment, apparatuses have been described as an example, but the invention of the present application is not limited to these apparatuses, and is applicable to a terminal apparatus or a communication device of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention.

Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, a location server, and a communication method.

The present international application claims priority based on JP 2016-153476 filed on Aug. 4, 2016, and all the contents of JP 2016-153476 are incorporated in the present international application by reference.

REFERENCE SIGNS LIST 1A, 2-2 Base station apparatus
2A, 2B, 2-1 Terminal apparatus
2-3 Location server
101 Higher layer processing unit
102 Controller
103 Transmitter
104 Receiver
1031 Physical signal generating unit
1032 Positional information generating unit
1041 Radio receiving unit
1042 Position measuring unit
201 Higher layer processing unit
202 Controller
203 Transmitter
204 Receiver
2031 Physical signal generating unit
2032 Positional information generating unit
2041 Radio receiving unit
2042 Position measuring unit
301 Controller
302 Receiver
303 Transmitter
304 Position measuring unit
305 Position managing unit

The invention claimed is:

1. A base station apparatus configured to communicate with a first terminal apparatus, a second terminal apparatus, and a location server, the base station apparatus comprising:
   physical signal generation circuitry configured to generate a narrowband positioning reference signal (NPRS) and a positioning reference signal (PRS); and
   transmission circuitry configured to transmit the NPRS on first consecutive subframes to the first terminal apparatus and the PRS on second consecutive subframes to the second terminal apparatus, wherein
   the NPRS is mapped on a first resource block and the PRS is mapped on second resource blocks, the second resource blocks being at least six in quantity,
   the transmission circuitry is configured to transmit, to the location server, first information indicating a first quantity of subframes within the first consecutive subframes and second information indicating a second quantity of subframes within the second consecutive subframes, and
   a first minimum quantity of subframes configurable in the first information is larger than a second minimum quantity of subframes configurable in the second information.

2. The base station apparatus according to claim 1, wherein a first maximum quantity of subframes configurable in the first information is larger than a second maximum quantity of subframes configurable in the second information.

3. The base station apparatus according to claim 1, wherein a first density of the NPRS in a time domain mapped on the first resource block is lower than a second density of the PRS in a time domain mapped on the second resource blocks.

4. A location server apparatus configured to communicate with a base station apparatus, a first terminal apparatus, and a second terminal apparatus, the location server comprising:
   reception circuitry configured to receive first cell information and second cell information, from the base station apparatus, and
   transmission circuitry configured to transmit the first cell information to the first terminal apparatus and the second cell information to the second terminal apparatus, wherein
   the first cell information indicates a first quantity of first consecutive subframes for a narrowband positioning reference signal (NPRS),
   the second cell information indicates a bandwidth of a positioning reference signal (PRS) and a second quantity of second consecutive subframes for the PRS,
   the NPRS is mapped on a first resource block and the PRS is mapped on second resource blocks, the second resource blocks being at least six in quantity, and
   a first minimum quantity of subframes configurable in the first cell information is larger than a second minimum quantity of subframes configurable in the second cell information.

5. A communication method for a base station apparatus configured to communicate with a first terminal apparatus, a second terminal apparatus, and a location server, the communication method comprising:
   generating a narrowband positioning reference signal (NPRS) and a positioning reference signal (PRS); and
   transmitting the NPRS on first consecutive subframes to the first terminal apparatus and the PRS on second consecutive subframes to the second terminal apparatus, wherein
   the NPRS is mapped on a first resource block and the PRS is mapped on second resource blocks, the second resource blocks being at least six in quantity,
   first information indicating a first quantity of subframes within the first consecutive subframes and second information indicating a second quantity of subframes within the second consecutive subframes are transmitted to the location server, and
   a first minimum quantity of subframes configurable in the first information is larger than a second minimum quantity of subframes configurable in the second information.

6. A communication method for a location server apparatus configured to communicate with a base station apparatus, a first terminal apparatus, and a second terminal apparatus, the communication method comprising:
   receiving first cell information and second cell information, from the base station apparatus, and
   transmitting the first cell information to the first terminal apparatus and the second cell information to the second terminal apparatus, wherein
   the first cell information indicates a first quantity of first consecutive subframes for a narrowband positioning reference signal (NPRS),
   the second cell information indicates a bandwidth of a positioning reference signal (PRS) and a second quantity of second consecutive subframes for the PRS,
   the NPRS is mapped on a first resource block and the PRS is mapped on second resource blocks, the second resource blocks being at least six in quantity, and
   a first minimum quantity of subframes configurable in the first cell information is larger than a second minimum quantity of subframes configurable in the second cell information.

* * * * *